United States Patent
Mitani et al.

(10) Patent No.: US 8,863,496 B2
(45) Date of Patent: Oct. 21, 2014

(54) PARTICULATE MATTER CONTROL SYSTEM AND ITS FAILURE DETERMINATION METHOD

(75) Inventors: Shinichi Mitani, Susono (JP); Hiroshi Nomura, Gotenba (JP); Eiji Murase, Gotenba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 141 days.

(21) Appl. No.: 13/438,928

(22) Filed: Apr. 4, 2012

(65) Prior Publication Data

US 2012/0272641 A1 Nov. 1, 2012

(30) Foreign Application Priority Data

Apr. 6, 2011 (JP) .................. 2011-084642

(51) Int. Cl.
*F01N 3/00* (2006.01)
*F01N 3/027* (2006.01)
*F01N 11/00* (2006.01)

(52) U.S. Cl.
CPC .............. *F01N 3/0275* (2013.01); *Y02T 10/47* (2013.01); *F01N 2900/0422* (2013.01); *F01N 2250/04* (2013.01); *F01N 2900/1606* (2013.01); *F01N 2900/0602* (2013.01); *F01N 11/00* (2013.01)
USPC ............... 60/227; 60/274; 60/275; 60/276; 60/295; 422/186.03; 422/186.12; 422/186.14; 422/186.15

(58) Field of Classification Search
USPC ........... 60/274, 275, 277, 286, 295, 311, 276; 422/186.03, 186.11, 186.12, 186.13, 422/186.14, 186.15, 186.16
See application file for complete search history.

(56) References Cited

U.S. PATENT DOCUMENTS

| | | | | |
|---|---|---|---|---|
| 5,263,317 A | * | 11/1993 | Watanabe et al. | 60/275 |
| 7,354,558 B2 | * | 4/2008 | Tsuji | 422/177 |
| 7,464,538 B2 | * | 12/2008 | Miki et al. | 60/275 |
| 8,136,343 B2 | * | 3/2012 | Zawacki et al. | 60/276 |
| 8,310,249 B2 | * | 11/2012 | Paterson | 324/693 |
| 8,561,388 B2 | * | 10/2013 | Yahata et al. | 60/277 |
| 2011/0047976 A1 | | 3/2011 | Tokuda et al. | |

FOREIGN PATENT DOCUMENTS

| | | |
|---|---|---|
| JP | 02191557 A | 7/1990 |
| JP | 2006-194116 A | 7/2006 |
| JP | 2009-041416 A | 2/2009 |
| JP | 2011-052544 A | 3/2011 |
| WO | 2012124086 A1 | 9/2012 |

* cited by examiner

*Primary Examiner* — Binh Q Tran
(74) *Attorney, Agent, or Firm* — Gifford, Krass, Sprinkle, Anderson & Citkowski, P.C.

(57) ABSTRACT

A particulate matter control system includes: an electrode that is provided in an exhaust pipe of an internal combustion engine; a power supply that is connected to the electrode and that applies voltage; a particle number detecting unit that detects the particle number of particulate matter on a downstream side of the electrode; a calculation unit that calculates a reduction rate of the particle number at the time when voltage is applied on the basis of the particle number detected by the particle number detecting unit at the time when voltage is applied and the particle number detected by the particle number detecting unit at the time when no voltage is applied; and a determination unit that determines that there is a failure when the reduction rate of the particle number, calculated by the calculation unit, is smaller than a threshold.

11 Claims, 4 Drawing Sheets

FIG.4

PARTICULATE MATTER CONTROL SYSTEM AND ITS FAILURE DETERMINATION METHOD

CROSS REFERENCE TO RELATED APPLICATIONS

This application claims priority to Japanese Patent Application No. 2011-084642 filed on Apr. 6, 2011, which is incorporated herein by reference in its entirety including the specification, drawings and abstract.

BACKGROUND OF THE INVENTION

1. Field of the Invention

The invention relates to a particulate matter control system and its failure determination method.

2. Description, of Related Art

There is known a technique in which a discharge electrode is provided in an exhaust pipe of an internal combustion engine and corona discharge is generated from the discharge electrode to electrically charge particulate matter (hereinafter, also referred to as PM) to thereby aggregate PM (for example, see Japanese Patent Application Publication No. 2006-194116 (JP 2006-194116 A)). By aggregating PM in this way, the particle number of PM may be reduced. In addition, the particle diameter of PM increases, so PM may be easily trapped by a filter provided on a downstream side.

Incidentally, because of a failure or degradation of the particulate matter control system, it may be difficult to aggregate PM. For example, even when a detected applied voltage and a detected current are normal, there is a case where PM cannot be caused to aggregate.

SUMMARY OF THE INVENTION

The object of the invention is to detect a failure of a particulate matter control system.

An aspect of the invention provides a particulate matter control system. The particulate matter control system includes: an electrode that is provided in an exhaust pipe of an internal combustion engine; a power supply that is connected to the electrode and that applies voltage; a particle number detecting unit that detects the particle number of particulate matter on a downstream side of the electrode; a calculation unit that calculates a reduction rate of the particle number at the time when voltage is applied from the power supply to the electrode on the basis of the particle number detected by the particle number detecting unit at the time when voltage is applied from the power supply to the electrode and the particle number detected by the particle number detecting unit at the time when no voltage is applied from the power supply to the electrode; and a determination unit that determines that there is a failure when the reduction rate of the particle number, calculated by the calculation unit, is smaller than a threshold.

Here, when voltage is applied to the electrode, PM may be electrically charged. Electrically charged PM moves toward the inner wall of the exhaust pipe by Coulomb force and the flow of exhaust gas. As PM reaches the inner wall of the exhaust pipe, the PM discharges electrons to the exhaust pipe, so electricity flows to the ground side with respect to the electrode. Then, PM that has discharged electrons aggregates with other PM present therearound, so it is possible to reduce the particle number.

Thus, the particle number of particulate matter, detected by the particle number detecting unit at the time when voltage is applied to the electrode, is the particle number after aggregation of PM. On the other hand, when no voltage is applied to the electrode, PM does not aggregate, so the particle number detected by the particle number detecting unit is equal to the particle number of particulate matter on the upstream side of the electrode. That is, the particle number detected by the particle number detecting unit is the particle number before aggregation of PM. The particle number detected by the particle number detecting unit may be regarded as the particle number of PM emitted from the internal combustion engine. Note that the particle number may be the number of PM particles per unit volume in exhaust gas.

Then, by comparing the particle number after aggregation of PM with the particle number before aggregation of PM, the reduction rate of PM particle number is calculated. The reduction rate of PM particle number may be the ratio of the particle number of PM, reduced through aggregation, with respect to the particle number of PM before aggregation. The particle number of PM before aggregation corresponds to the particle number detected by the particle number detecting unit at the time when no voltage is applied from the power supply to the electrode. In addition, the particle number of PM, reduced through aggregation, corresponds to a value obtained by subtracting the particle number detected by the particle number detecting unit at the time when voltage is applied from the power supply to the electrode from the particle number detected by the particle number detecting unit at the time when no voltage is applied from the power supply to the electrode.

However, when there is a failure in the particulate matter control system, PM may not aggregate even when voltage is applied or aggregation of PM may be insufficient. That is, when there is a failure in the particulate matter control system, the reduction rate of PM particle number is lower than that in the case where the particulate matter control system is normal. Thus, when the reduction rate of PM particle number is smaller than the threshold, it may be determined that there is a failure in the particulate matter control system. The threshold may be the lower limit of the reduction rate of particle number in the case where the particulate matter control system is normal.

In the aspect of the invention, the particulate matter control system may further include: a treatment unit that is provided in the exhaust pipe and in which the electrode is installed; an insulating unit that insulates electricity between the treatment unit and the exhaust pipe; a grounding unit that grounds the treatment unit; a current detecting unit that detects a current at the grounding unit; and a voltage detecting unit that detects an applied voltage at the time when pulse current occurs in the current detected by the current detecting unit, wherein the time when voltage is applied from the power supply to the electrode may be the time when a voltage lower than the applied voltage detected by the voltage detecting unit is applied.

Here, when the voltage applied to the electrode is increased, larger amounts of electrons are discharged from the electrode. Therefore, aggregation of PM may be facilitated, so the particle number of PM may be further reduced. That is, the reduction rate of PM particle number increases. However, when the voltage applied to the electrode is excessively increased, strong discharge, such as corona discharge and arc discharge, can occur. As such strong discharge occurs, PM is formed into fine particles by high-energy electrons. That is, the reduction rate of PM particle number decreases. Thus, it is not always better to increase the applied voltage. In addition, as such strong discharge occurs, the reduction rate of PM particle number reduces, so there is a possible erroneous determination when failure determination is made at this time.

Therefore, the applied voltage may be set such that strong discharge does not occur at the time when voltage is applied. Note that, even with the applied voltage that does not cause strong discharge, such as corona discharge and arc discharge, PM may be caused to aggregate. Here, when a current is detected at the grounding unit, pulse current is detected when strong discharge has occurred in the electrode. That is, by applying voltage, so as not to cause pulse current, occurrence of strong discharge may be suppressed.

For example, the applied voltage is gradually increased, and the applied voltage is decreased at the time when pulse current has occurred. By so doing, occurrence of strong discharge may be suppressed, so it is possible to suppress formation of fine particles of PM.

In addition, by increasing the applied voltage within the range in which no pulse current occurs, PM more easily aggregates. That is, by increasing the applied voltage within the range in which no pulse current occurs, it is possible to facilitate aggregation of PM. Therefore, feedback control may be executed such that the applied voltage becomes maximum within the range in which no pulse current occurs. In this way, the reduction rate of PM particle number may be further increased. However, when there is a failure in the particulate matter control system, the reduction rate of PM particle number does not increase even when the applied voltage is increased within the range in which no pulse current occurs. That is, when the reduction rate of PM particle number is low although voltage that should increase the reduction rate is applied, it may be determined that there is a failure in the particulate matter control system.

Note that the current detecting unit detects a current on the side adjacent to the reference point of potential with respect to the electrode. Generally, wires are longer or thicker on the power supply side with respect to the electrode than on the grounding side with respect to the electrode. In addition, electric charge may be stored on the power supply side with respect to the electrode. In such a case, if a current is detected on the power supply side with respect to the electrode, even when strong discharge occurs in the electrode, a rise or fall of a current detected by the current detecting unit at that time is slow. Therefore, it may be difficult to detect pulse current. Thus, when a current is detected on the power supply side with respect to the electrode, occurrence of strong discharge may not be suppressed. Therefore, the reduction rate of PM particle number may reduce, so there is a possible erroneous determination when failure determination is made.

On the other hand, on the grounding side with respect to the electrode, wires may be relatively short and narrow. Therefore, when a current is detected on the grounding side with respect to the electrode, pulse current is easily detected when strong discharge has occurred. Thus, by detecting a current on the grounding side with respect to the electrode, it is possible to further reliably detect occurrence of strong discharge. By so doing, it is possible to increase the accuracy of failure determination.

In addition, because the insulating unit is provided, it is possible to suppress flow of electricity to a portion other than the grounding unit. Therefore, it is possible to further accurately detect pulse current when strong discharge has occurred.

In addition, in the aspect of the invention, the threshold may be changed on the basis of the particle number detected by the particle number detecting unit.

Alternatively, the threshold may be changed on the basis of the particle number detected by the particle number detecting unit at the time when no voltage is applied from the power supply to the electrode. Here, as the particle number of PM increases, the distances between PM particles reduce, so the influence of electrostatic action relatively increases. Therefore, as the particle number of PM increases, PM aggregates with a smaller applied voltage. Thus, as the particle number of PM increases, the reduction rate of PM particle number increases. The threshold may be changed in coordination with the particle number of PM. That is, PM more easily aggregates as the particle number of PM increases, so, when the particulate matter control system is normal, the reduction rate of PM particle number should increase. Therefore, as the particle number of PM increases, the threshold, may be increased; as the particle number of PM reduces, the threshold may be reduced. By so doing, it is possible to increase the accuracy of failure determination.

In the aspect of the invention, the particulate matter control system may further include an emission gas quantity detecting unit that detects or estimates an emission gas quantity from the internal combustion engine, wherein the threshold may be changed on the basis of the emission gas quantity detected or estimated by the emission gas quantity detecting unit.

Here, as the emission gas quantity reduces, the inertial force of PM reduces, so the influence of electrostatic action relatively increases. Therefore, PM easily aggregates. Thus, as the emission gas quantity reduces, PM aggregates with a smaller applied voltage. Therefore, as the emission gas quantity reduces, the reduction rate of PM particle number increases. The threshold may be changed in coordination with the emission gas quantity. That is, because PM more easily aggregates as the emission gas quantity reduces, so, when the particulate matter control system is normal, the reduction rate of PM particle number should increase. Therefore, as the emission gas quantity reduces, the threshold may be increased; as the emission gas quantity increases, the threshold may be reduced. By so doing, it is possible to increase the accuracy of failure determination.

Another aspect of the invention provides a failure determination method for a particulate matter control system. The failure determination method for a particulate matter control system having an electrode that is provided in an exhaust pipe of an internal combustion engine and a power supply that is connected to the electrode and that applies voltage includes: detecting the particle number of particulate matter on a downstream side of the electrode; calculating a reduction rate of the particle number at the time when voltage is applied from the power supply to the electrode on the basis of the particle number detected at the time when voltage is applied from the power supply to the electrode and the particle number detected at the time when no voltage is applied from the power supply to the electrode; and determining that there is a failure when the calculated reduction rate of the particle number is smaller than a threshold.

According to the aspects of the invention, it is possible to detect a failure of the particulate matter control system.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, specific embodiments of a particulate matter control system according to the aspect of the invention will be described with reference to the accompanying drawings.

Figure 1:
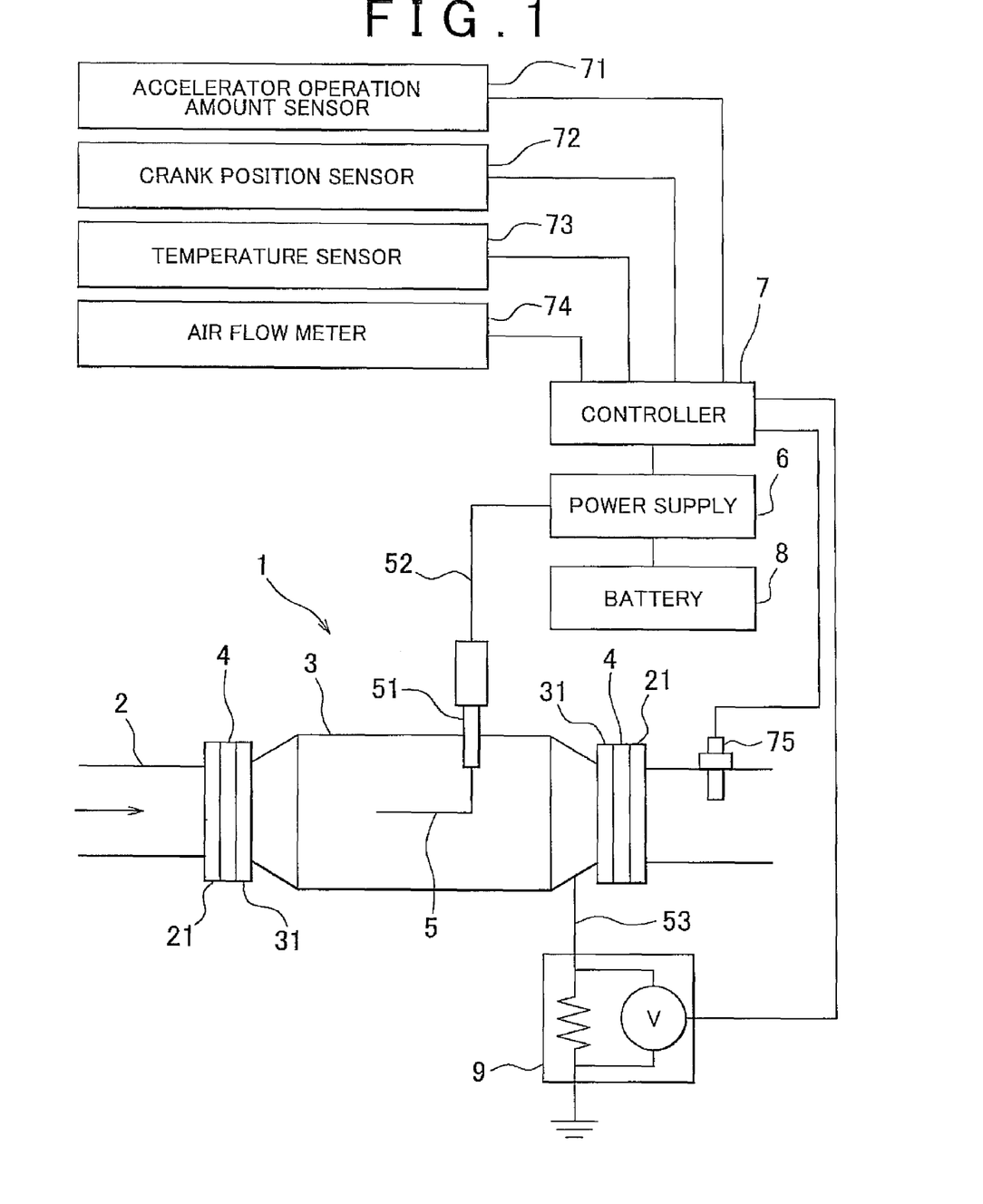
FIG. 1 is a view that shows the schematic configuration of a particulate matter control system according to a first embodiment.

FIG. 1 is a view that shows the schematic configuration of a particulate matter control system 1 according to a first embodiment. The particulate matter control system 1 is, for example, provided for an exhaust pipe 2 of a gasoline engine. Note that the particulate matter control system 1 may be provided for an exhaust pipe of a diesel engine.

The particulate matter control system 1 is formed of a housing 3 of which both ends are connected to the exhaust pipe 2. The material of the housing 3 is a stainless steel. The housing 3 is formed into a hollow circular cylindrical shape having a larger diameter than the exhaust pipe 2. Both ends of the housing 3 are formed in a tapered shape such that the cross sectional area reduces toward the end portion. Note that, in FIG. 1, exhaust gas flows through the exhaust pipe 2 in the direction indicated by the arrow and flows into the housing 3. Therefore, the housing 3 may be part of the exhaust pipe 2. Note that, in the present embodiment, the housing 3 corresponds to a treatment unit according to the aspect of the invention.

The exhaust pipe 2 is connected to the housing 3 via insulating units 4. Each of the insulating units 4 is formed of an electrical insulator. Each of the insulating units 4 is held between a flange 21 and a flange 31. The flange 21 is formed at each end portion of the exhaust pipe 2. The flange 31 is formed at each end portion of the housing 3. The exhaust pipe 2 and the housing 3 are fastened to each other by, for example, bolts and nuts. Then, these bolts and nuts are electrically insulated such that electricity does not flow through these bolts and nuts. By so doing, electricity is prevented from flowing between the exhaust pipe 2 and the housing 3.

An electrode 5 is attached to the housing 3. The electrode 5 penetrates through the side of the housing 3, extends from the side of the housing 3 toward the central axis of the housing 3, bends near the central axis toward the upstream side of the flow of exhaust gas, and extends toward the upstream side of the flow of exhaust gas parallel to the central axis. Therefore, the end portion of the electrode 5 is located near the central axis of the housing 3. In addition, an insulation portion 51 made of an electrical insulator is provided for the electrode 5 such that electricity does not flow between the electrode 5 and the housing 3. The insulation portion 51 is located between the electrode 5 and the housing 3. The insulation portion 51 has the function of insulating electricity and fixing the electrode 5 to the housing 3.

Then, the electrode 5 is connected to a power supply 6 via a power supply-side electric wire 52. The power supply 6 is able to conduct current to the electrode 5 and vary a voltage applied to the electrode 5. The power supply 6 is connected to an electronic controller 7 and a battery 8 via electric wires. The controller 7 controls the voltage applied to the electrode 5 by the power supply 6.

In addition, a ground-side electric wire 53 is connected to the housing 3, and the housing 3 is grounded via the ground-side electric wire 53. A current detector 9 is provided in the ground-side electric wire 53. The current detector 9 detects a current passing through the ground-side electric wire 53. The current detector 9 detects a current by, for example, measuring a potential difference between both ends of a resistor provided in the middle of the ground-side electric wire 53. The current detector 9 is connected to the controller 7 via an electric wire. Then, the current detected by the current detector 9 is input to the controller 7. Note that, in the present embodiment, the ground-side electric wire 53 corresponds to a grounding unit according to the aspect of the invention. In addition, in the present embodiment, the current detector 9 corresponds to a current detecting unit according to the aspect of the invention.

In addition, a particle number sensor 75 is provided in the exhaust pipe 2 downstream of the housing 3. The particle number sensor 75 detects the particle number of PM in exhaust gas. The particle number sensor 75 detects the particle number of PM per unit volume in exhaust gas. The particle number sensor 75 is connected to the controller 7 via an electric wire. The particle number of PM, detected by the particle number sensor 75, is input to the controller 7. Note that, in the present embodiment, the particle number sensor 75 corresponds to a particle number detecting unit according to the aspect of the invention.

Note that an accelerator operation amount sensor 71, a crank position sensor 72, a temperature sensor 73 and an air flow meter 74 are connected to the controller 7. The accelerator operation amount sensor 71 outputs an electrical signal, corresponding to an amount by which an acceleration pedal is depressed by a driver of a vehicle on which the internal combustion engine is mounted, to thereby detect the engine load. The crank position sensor 72 detects the engine rotation speed. The temperature sensor 73 detects the temperature of coolant of the internal combustion engine or the temperature of lubricating oil to detect the temperature of the internal combustion engine. The air flow meter 74 detects the intake air volume of the internal combustion engine.

In the thus configured particulate matter control system 1, a negative direct-current high voltage is applied from the power supply 6 to the electrode 5 to thereby discharge electrons from the electrode 5. That is, the potential of the electrode 5 is set so as to be lower than the potential of the housing 3 to thereby cause electrons to be discharged from the electrode 5. Then, PM in exhaust gas may be negatively charged by the electrons. The negatively charged PM moves by Coulomb force and gas flow. Then, as the PM reaches the housing 3, the electrons with which the PM is negatively charged are discharged to the housing 3. The PM that has discharged electrons to the housing 3 aggregates, and the particle diameter of the PM increases. In addition, as the PM aggregates, the particle number of PM reduces. That is, by applying voltage to the electrode 5, the particle diameter of PM may be increased and the particle number of PM may be reduced.

Note that, in the present embodiment, the electrode 5 is bent toward the upstream side of the flow of exhaust gas; instead, the electrode 5 may be bent toward the downstream side. Here, as in the case of the present embodiment, when the electrode 5 is bent toward the upstream side of the flow of exhaust gas, PM is hard to adhere to the insulation portion 51. That is, PM may be electrically charged on the upstream side of the insulation portion 51, so the PM moves toward the inner peripheral surface of the housing 3. Therefore, the amount of PM that collides with the insulation portion 51 reduces, so PM is hard to adhere to the insulation portion 51. However, as the electrode 5 is bent toward the upstream side of the flow of exhaust gas, the electrode 5 easily deforms by receiving force from the flow of exhaust gas. Therefore, this configuration is appropriate for the case where the electrode 5 is short. On the other hand, as the electrode 5 is bent toward the downstream side of the flow of exhaust gas, PM easily adheres to the insulation portion 51; however, the electrode 5 is hard to deform even when the electrode 5 receives force from the flow of exhaust gas. Therefore, this configuration ensures high durability and high reliability, so the electrode 5 may be elongated.

Then, the controller 7 determines whether there is a failure in the particulate matter control system 1 on the basis of the particle number of PM, detected by the particle number sensor 75 when voltage is applied to the electrode 5, and the particle number of PM, detected by the particle number sensor 75 when no voltage is applied to the electrode 5.

Here, when no voltage is applied to the electrode 5, electrons are not discharged from the electrode 5, so PM does not aggregate. Therefore, the particle number of PM, detected by the particle number sensor 75, is equal to the particle number of PM in exhaust gas flowing into the housing 3. This may be regarded as the particle number of PM emitted from the internal combustion engine. In addition, the particle number of PM, detected in the case where no voltage is applied to the electrode 5, may be regarded as the particle number of PM before PM aggregates.

On the other hand, in the case where voltage is applied to the electrode 5, when the particulate matter control system 1 is normal, electrons are discharged from the electrode 5 and then PM aggregates. That is, in comparison with the case where no voltage is applied to the electrode 5, the particle number of PM, detected by the particle number sensor 75, reduces. That is, the reduction rate of PM particle number increases.

Here, the reduction rate of PM particle number is the ratio of the particle number of PM, which reduces in the housing 3, with respect to the particle number of PM that flows into the housing 3. The particle number of PM, which reduces in the housing 3, may be obtained by subtracting the particle number of PM, detected by the particle number sensor 75 when voltage is applied to the electrode 5, from the particle number of PM, detected by the particle number sensor 75 when no voltage is applied to the electrode 5. Then, it is possible to calculate the reduction rate of PM particle number by dividing the particle number of PM, which reduces in the housing 3, by the particle number of PM, detected when no voltage is applied to the electrode 5.

However, in the case where there is a failure in the particulate matter control system 1, even when voltage is applied to the electrode 5, electrons may not be discharged from the electrode 5 or discharge of electrons may be insufficient. Therefore, in the case where there is a failure in the particulate matter control system 1, because the reduction amount of PM particle number is smaller than that in the case where the particulate matter control system 1 is normal, the particle number of PM, detected by the particle number sensor 75, increases. That is, the reduction rate of PM particle number decreases.

Then, the controller 7 compares the reduction rate of PM particle number with a threshold to thereby determine whether there is a failure in the particular matter control system 1. That is, in the case where there is a failure in the particulate matter control system 1, the reduction rate of PM particle number decreases, so it is determined that there is a failure in the particulate matter control system 1 when the reduction rate is smaller than the threshold. Note that the threshold is obtained in advance through experiments, or the like, as the reduction rate of PM particle number in the case where the particulate matter control system 1 is normal.

Figure 2:
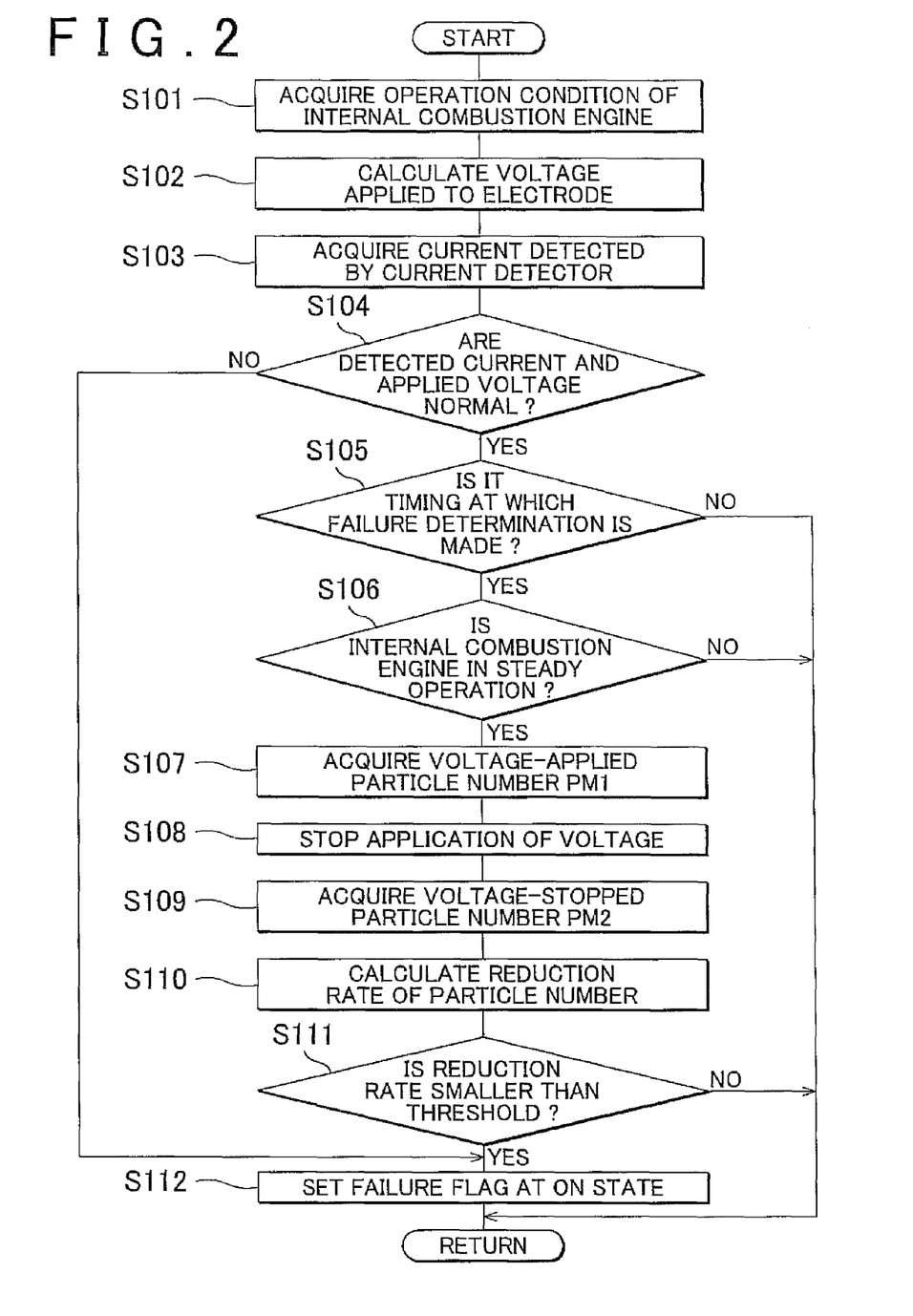
FIG. 2 is a flow chart that shows the flow of failure determination according to the embodiment.

FIG. 2 is a flow chart that shows the flow of failure determination according to the present embodiment. The routine is repeatedly executed by the controller 7 at predetermined intervals.

In step S101, the operation condition of the internal combustion engine is acquired. For example, values required to execute the following process, such as the engine rotation speed, the engine load and the temperature of the internal combustion engine, are loaded. The engine rotation speed is detected by the crank position sensor 72. The engine load is detected by the accelerator operation amount sensor 71. In addition, the temperature of the internal combustion engine (for example, the temperature of lubricating oil or the temperature of coolant) is detected by the temperature sensor 73.

In step S102, the voltage applied to the electrode 5 is calculated. The applied voltage is set on the basis of an estimated particle number of PM (particles/cm$^3$). The particle number of PM is the particle number of PM emitted from the internal combustion engine, and is the particle number of PM before flowing into the housing 3. The particle number of PM correlates with the engine rotation speed, the engine load, and the temperature of the internal combustion engine (for example, the temperature of lubricating oil or the temperature of coolant), so the particle number of PM is calculated on the basis of these values. A plurality of maps for calculating the particle number of PM from the engine rotation speed and the engine load may be stored in correspondence with the temperatures of the internal combustion engine and then the particle number of PM may be calculated on the basis of the maps.

Note that a sensor that detects the particle number of PM may be attached in the exhaust pipe 2 upstream of the housing 3 and then the particle number of PM may be detected by the sensor. In addition, a value detected by the particle number sensor 75 when no voltage is applied to the electrode 5 may be used.

Then, the applied voltage is calculated on the basis of the particle number of PM and the emission gas quantity (g/sec) of the internal combustion engine. This correlation may be obtained in advance through experiments, or the like, and may be when mapped. The emission gas quantity of the internal combustion engine correlates with the intake air volume of the internal combustion engine, so the emission gas quantity may be obtained on the basis of the intake air volume detected by the air flow meter 74.

Here, as the emission gas quantity reduces, the inertial force of PM reduces, so the influence of electrostatic action relatively increases. Therefore, PM more easily aggregates. Thus, as the emission gas quantity reduces, PM aggregates with a smaller applied voltage. Therefore, as the emission gas quantity reduces, the applied voltage is decreased. In addition, as the particle number of PM increases, the distances between PM particles reduce, so the influence of electrostatic action relatively increases. Therefore, as the particle number of PM increases, PM aggregates with a smaller applied voltage. Therefore, as the particle number of PM increases, the applied voltage is decreased.

In addition, the applied voltage may be, for example, set at a value by which the reduction rate of PM particle number becomes a predetermined value (for example, 40%). In addition, the applied voltage may be set at a predetermined value.

Furthermore, the applied voltage may be increased as much as possible within the range in which pulse current does not occur. That is, the applied voltage may be calculated by the following manner.

Here, when a negative voltage applied to the electrode 5 is increased, larger amounts of electrons are discharged from the electrode 5. Therefore, aggregation of PM may be facilitated, so the particle number of PM may be further reduced. However, when the voltage applied to the electrode 5 is excessively increased, strong discharge, such as corona discharge and arc discharge, can occur. As such strong discharge occurs, PM is formed into fine particles by high-energy electrons. Thus, in order to facilitate aggregation of PM, it is desirable to adjust the applied voltage to a voltage lower than that at which strong discharge, such as corona discharge, occurs. Here, as strong discharge, such as corona discharge, occurs, pulse current is detected by the current detector 9.

Then, the applied voltage is adjusted to within the range in which no pulse current occurs. In this case, a voltage lower than the applied voltage at which pulse current occurs is applied to the electrode 5. By so doing, occurrence of pulse current is suppressed to thereby suppress an increase in the particle number of PM. Therefore, the applied voltage is increased until pulse current occurs to thereby detect the applied voltage at which the pulse current starts occurring. Note that, in the present embodiment, the controller 7 that detects the applied voltage at which pulse current starts occurring corresponds to a voltage detecting unit according to the aspect of the invention. Then, the voltage applied to the electrode 5 in the case where pulse current has occurred is decreased to adjust the voltage applied to the electrode 5 so as to be lower than the voltage at which pulse current occurs. Note that the applied voltage at which pulse current occurs may be detected by reading predictive information about occurrence of pulse current from a detected current before pulse current actually occurs. In addition, the applied voltage at which pulse current occurs may be an applied voltage at the boundary of whether pulse current occurs.

Note that, in the present embodiment, the insulating units 4 are provided and, in addition, a current is detected at the ground-side electric wire 53, so it is possible to further accurately detect pulse current.

After the applied voltage is calculated in this way, the voltage is applied. Then, the process proceeds to step S103, and the detected current is acquired. The detected current is a value detected by the current detector 9.

In step S104, it is determined whether the applied voltage and the detected current respectively fall within normal ranges. Here, when the applied voltage or the detected current indicates an abnormal numeric value, it may be determined that there is a failure without detecting the particle number of PM. The normal range of the applied voltage and the normal range of the detected current are set in advance. When affirmative determination is made in step S104, the process proceeds to step S105. When negative determination is made in step S104, the process proceeds to step S112.

In step S105, it is determined whether it is the timing at which failure determination is made. For example, it is determined whether the accumulated value of the operating time of the internal combustion engine since failure determination has been previously made has reached a predetermined value. That is, each time the accumulated value of the operating time has reached the predetermined value, failure determination is made. For example, it may be determined that it is the timing at which failure determination is made when the accumulated operating time of the internal combustion engine is a multiple of the predetermined value. In addition, it may be determined that it is the timing at which failure determination is made when the travel distance of the vehicle on which the internal combustion engine is mounted is a multiple of a predetermined value. These predetermined values are set in advance as values at which failure determination is required. Then, when affirmative determination is made in step S105, the process proceeds to step S106. When negative determination is made in step S105, the routine ends.

In step S106, it is determined whether the internal combustion engine is in a steady operation. Because the particle number of PM varies on the basis of the operation condition of the internal combustion engine, so it may be difficult to make failure determination when the operation condition of the internal combustion engine varies in the process of failure determination. Thus, in the present embodiment, failure determination is made during the steady operation of the internal combustion engine. When a variation in the engine rotation speed obtained by the crank position sensor 72 and a variation in the engine load obtained by the accelerator operation amount sensor 71 in a predetermined period respectively fall within predetermined ranges that may be regarded as steady condition, it is determined that the internal combustion engine is in the steady operation. When affirmative determination is made in step S106, the process proceeds to step S107. When negative determination is made in step S106, the routine ends.

In step S107, the particle number of PM, detected by the particle number sensor 75, is acquired. In this step, the particle number of PM at the time when voltage is applied is detected. The particle number of PM, acquired in this step, is termed voltage-applied particle number PM1.

In step S108, application of voltage is stopped. That is, the applied voltage is set at 0. By so doing, PM stops aggregating.

In step S109, the particle number of PM, detected by the particle number sensor 75, is acquired. In this step, the particle number of PM at the time when no voltage is applied is detected. The particle number of PM, acquired in this step, is termed voltage-stopped particle number PM2.

In step S110, the reduction rate of PM particle number is calculated. The reduction rate is calculated by the following mathematical expression.

$$\text{Reduction Rate}=(PM2-PM1)/PM2$$

Note that, in the present embodiment, the controller 7 that processes step S110 corresponds to a calculation unit according to the aspect of the invention.

In step S111, it is determined whether the reduction rate of PM particle number, calculated in step S110, is smaller than a threshold. In this step, it is determined whether the particle number of PM is sufficiently reduced by applying the voltage. The threshold is the lower limit of the reduction rate of PM particle number when the particulate matter control system 1 is normal, and is obtained in advance through experiments, or the like. When affirmative determination is made in step S111, the process proceeds to step S112. When negative determination is made in step S111, there is no failure in the particulate matter control system 1, so the routine ends. Note that, in the present embodiment, the controller 7 that processes step S111 corresponds to a determination unit according to the aspect of the invention.

In step S112, a failure flag is set at an on state. The failure flag is set at an on state when there is a failure in the particulate matter control system 1, and is set at an off state when there is no failure in the particulate matter control system 1. The failure flag is initially set at an off state. Then, when the failure flag is set at an on state, for example, an alarm lamp is turned on to, inform the driver of the vehicle that there is a failure in the particulate matter control system 1.

As described above, according to the present embodiment, it is possible to determine whether there is a failure in the particulate matter control system 1 on the basis of the reduction rate of PM particle number, calculated from the particle number of PM before application of the voltage is stopped and the particle number of PM after application of the voltage is stopped. In addition, by applying the voltage lower than the voltage at which pulse current occurs, the accuracy of failure detection may be increased.

Next, in a second embodiment, the threshold used in step S111 of FIG. 2 is changed on the basis of at least any one of the particle number of PM and the emission gas quantity of the internal combustion engine. The other devices, and the like, are the same as those of the first embodiment, so the description is omitted.

Figure 3:
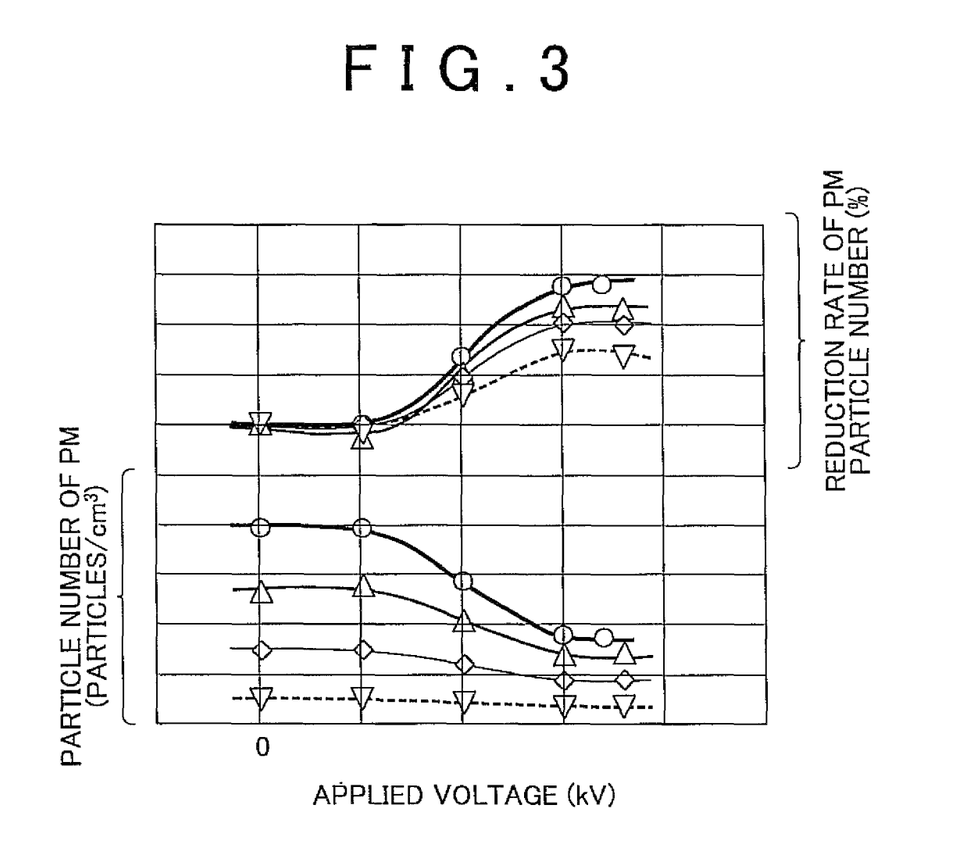
FIG. 3 is a graph that shows the correlation among an applied voltage, the particle number of PM and the reduction rate of PM particle number.

FIG. 3 is a graph that shows the correlation among an applied voltage, the particle number of PM and the reduction rate of PM particle number. FIG. 3 shows four types of correlations (circular symbol, triangular symbol, rhombic symbol and inverted triangular symbol) in which the particle number of PM flowing into the housing 3 is different. The time at which the applied voltage is 0 (kV) corresponds to the time at which application of the voltage to the electrode 5 is stopped. That is, the particle number of PM at the time when the applied voltage is 0 (kV) corresponds to the particle number of PM flowing into the housing 3. The particle number of PM flowing into the housing 3 is the largest in the case of the circular symbol and reduces in order of the triangular symbol, the rhombic symbol and the inverted triangular symbol.

Then, in the circular symbol of which the particle number of PM flowing into the housing 3 is the largest, the reduction rate of PM particle number is the highest. On the other hand, in the inverted triangular symbol of which the particle number of PM flowing into the housing 3 is the smallest, the reduction rate of PM particle number is the lowest. Then, as is apparent from FIG. 3, as the particle number of PM flowing into the housing 3 increases, the reduction rate of PM particle number increases.

Here, as the particle number of PM increases, the distances between PM particles reduce, so the influence of electrostatic action relatively increases. Therefore, as the particle number of PM increases, PM aggregates with a smaller applied voltage. Therefore, as the particle number of PM increases, the reduction rate of PM particle number increases. Then, the particle number of PM can vary with the individual difference and aging of the internal combustion engine.

Thus, by changing the threshold on the basis of the particle number of PM, it is possible to increase the accuracy of failure detection. Here, when the particulate matter control system 1 is normal, the reduction rate of PM particle number should increase as the particle number of PM increases. Therefore, as the particle number of PM increases, the threshold is increased. For example, the correlation between the particle number of PM and a correction coefficient is obtained in advance through experiments, or the like. Then, the correction coefficient is obtained from the detected voltage-stopped particle number PM2 and is multiplied by the threshold to thereby change the threshold. Note that the correction coefficient may be set such that the threshold falls within a predetermined range from the reduction rate of PM particle number shown in FIG. 3.

In this way, the threshold is increased as the particle number of PM increases to thereby make it possible to further increase the accuracy of failure determination.

In addition, the reduction rate of PM particle number varies with the emission gas quantity of the internal combustion engine. Here, as the emission gas quantity reduces, the inertial force of PM reduces, so the influence of electrostatic action relatively increases. Therefore, PM easily aggregates. Thus, as the emission gas quantity reduces, PM aggregates with a lower applied voltage. Therefore, as the emission gas quantity reduces, the reduction rate of PM particle number increases.

Figure 4:
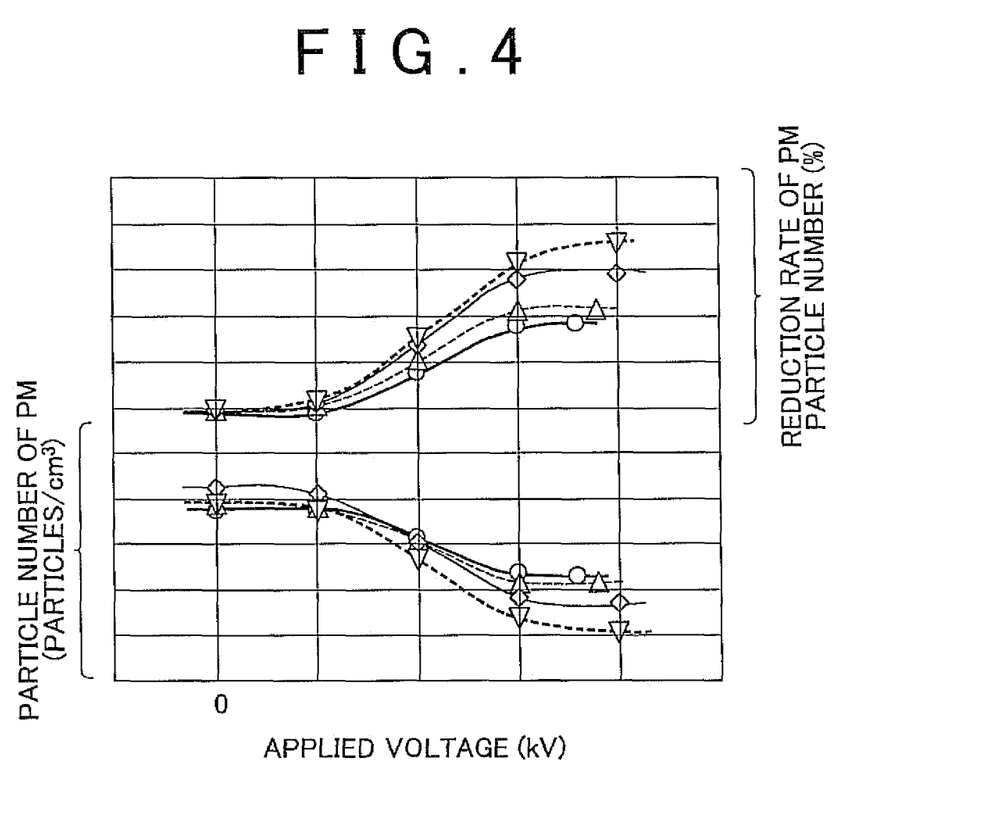
FIG. 4 is a graph that shows the correlation among an applied voltage, the particle number of PM and the reduction rate of PM particle number.

FIG. 4 is a graph that shows the correlation among an applied Voltage, the particle number of PM and the reduction rate of PM particle number. FIG. 4 shows four types of correlations (circular symbol, triangular symbol, rhombic symbol and inverted triangular symbol) in which the emission gas quantity from the internal combustion engine is different. The emission gas quantity is the largest in the case of the circular symbol, and reduces in order of the triangular symbol, the rhombic symbol and the inverted triangular symbol. The time at which the applied voltage is 0 (kV) corresponds to the time at which application of the voltage to the electrode 5 is stopped. Then, the operation condition of the internal combustion engine is adjusted such that the particle number of PM at the time when the applied voltage is 0 (kV) is a substantially equal value even with any emission gas quantity.

Then, in the circular symbol of which the emission gas quantity is the largest, the reduction rate of PM particle number is the lowest. On the other hand, in the inverted triangular symbol of which the emission gas quantity is the smallest, the reduction rate of PM particle number is the highest. Then, as is apparent from FIG. 4, as the emission gas quantity reduces, the reduction rate of PM particle number increases.

Thus, by changing the threshold on the basis of the emission gas quantity, it is possible to increase the accuracy of failure detection. Here, when the particulate matter control system 1 is normal, the reduction rate of PM particle number should increase as the emission gas quantity reduces. Therefore, as the emission gas quantity reduces, the threshold is increased. For example, the correlation between an emission gas quantity and a correction coefficient is obtained in advance through experiments, or the like. Then, the correction coefficient is obtained from the detected emission gas quantity and is multiplied by the threshold to thereby change the threshold. Note that the emission gas quantity (g/sec) of the internal combustion engine correlates with the intake air volume of the internal combustion engine, so the emission gas quantity may be obtained on the basis of the intake air volume detected by the air flow meter 74. Note that, in, the present embodiment, the controller 7 that calculates the emission gas quantity corresponds to an emission gas quantity detecting unit according to the aspect of the invention.

In this way, the threshold is increased as the emission gas quantity reduces to thereby make it possible to further increase the accuracy of failure determination.

Furthermore, the threshold may be changed on the basis of both the particle number of PM and the emission gas quantity. For example, the correlation among the particle number of PM, an emission gas quantity and a correction coefficient is obtained in advance through experiments, or the like. Then, the correction coefficient is obtained from the detected particle number of PM and the detected emission gas quantity, and is multiplied by the threshold to thereby change the threshold. By so doing, it is possible to further increase the accuracy of failure detection.

As described above, according to the present embodiment, the threshold is changed on the basis of at least any one of the particle number of PM and the emission gas quantity of the internal combustion engine to thereby make it possible to further increase the accuracy of failure detection.

While the invention has been described with reference to example embodiments thereof, it is to be understood that the invention is not limited to the example described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A particulate matter control system comprising:
   an electrode that is provided in an exhaust pipe of an internal combustion engine, the electrode configured to aggregate particulate matter when a voltage is applied;
   a power supply that is connected to the electrode and that applies the voltage;
   a particle number detecting unit that detects a particle number of particulate matter on a downstream side of the electrode;
   a calculation unit that calculates a reduction rate of the particle number at the time when the voltage is applied from the power supply to the electrode on the basis of a comparison of the particle number detected by the particle number detecting unit at the time when the voltage is applied from the power supply to the electrode with the particle number detected by the particle number detecting unit at the time when no voltage is applied from the power supply to the electrode; and
   a determination unit that determines that there is a failure when the reduction rate of the particle number, calculated by the calculation unit, is smaller than a threshold.

2. The particulate matter control system according to claim 1, further comprising:
   a treatment unit that is provided in the exhaust pipe and in which the electrode is installed;
   an insulating unit that insulates electricity between the treatment unit and the exhaust pipe;
   a grounding unit that grounds the treatment unit;
   a current detecting unit that detects a current at the grounding unit; and
   a voltage detecting unit that detects an applied voltage at the time when pulse current occurs in the current detected by the current detecting unit, wherein
   the time when voltage is applied from the power supply to the electrode is the time when a voltage lower than the applied voltage detected by the voltage detecting unit is applied.

3. The particulate matter control system according to claim 1, wherein
   the threshold is changed on the basis of the particle number detected by the particle number detecting unit.

4. The particulate matter control system according to claim 3, wherein
   the threshold is increased as the particle number detected by the particle number detecting unit increases.

5. The particulate matter control system according to claim 1, further comprising:
   an emission gas quantity detecting unit that detects or estimates an emission gas quantity from the internal combustion engine, wherein
   the threshold is changed on the basis of the emission gas quantity detected or estimated by the emission gas quantity detecting unit.

6. The particulate matter control system according to claim 5, wherein
   the threshold is increased as the emission gas quantity detected or estimated by the emission gas quantity detecting unit reduces.

7. A failure determination method for a particulate matter control system having an electrode that is provided in an exhaust pipe of an internal combustion engine, the electrode configured to aggregate particulate matter when a voltage is applied and a power supply that is connected to the electrode and that applies the voltage, comprising:
   detecting a particle number of particulate matter on a downstream side of the electrode by a particle number sensor;
   calculating, by an electronic controller, a reduction rate of the particle number at the time when the voltage is applied from the power supply to the electrode on the basis of a comparison of the particle number detected at the time when the voltage is applied from the power supply to the electrode with the particle number detected at the time when no voltage is applied from the power supply to the electrode; and
   determining, by the electronic controller, that there is a failure when the calculated reduction rate of the particle number is smaller than a threshold.

8. The failure determination method according to claim 7, further comprising:
   changing the threshold on the basis of the detected particle number.

9. The failure determination method according to claim 8, wherein
   the threshold is increased as the detected particle number increases.

10. The failure determination method according to claim 7, further comprising:
    detecting or estimating, by the electronic controller, an emission gas quantity from the internal combustion engine; and
    changing the threshold, by the electronic controller, on the basis of the detected emission gas quantity or the estimated emission gas quantity.

11. The failure determination method according to claim 10, wherein
    the threshold is increased as the detected emission gas quantity or the estimated emission gas quantity reduces.

* * * * *